Sept. 29, 1925.
S. J. CLULEE
EYEGLASS CONSTRUCTION
Filed Feb. 2, 1923
1,555,458
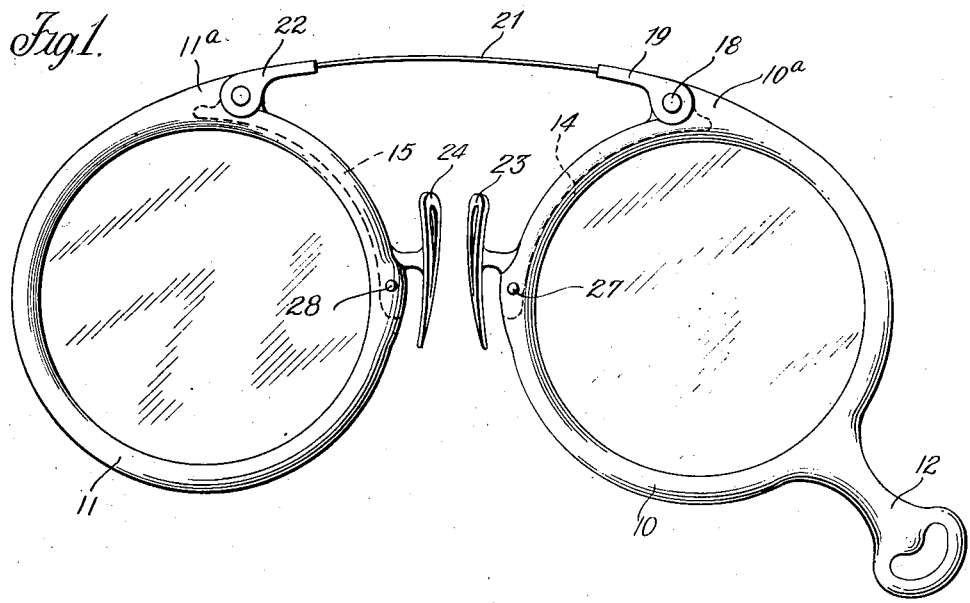
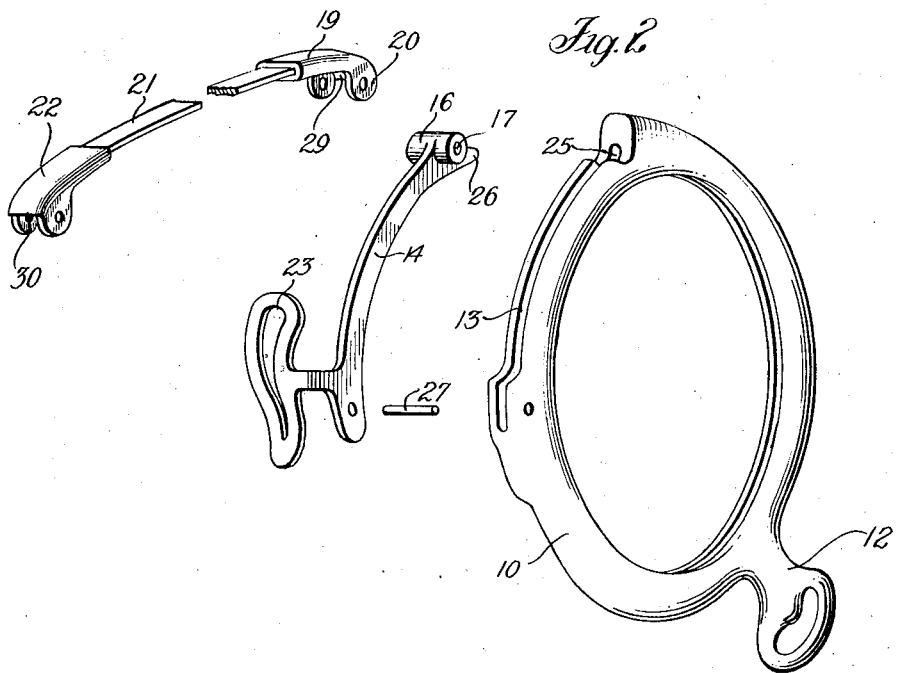
INVENTOR
Stephen J. Clulee
BY
Robert L. Blair
ATTORNEY Patented Sept. 29, 1925.

1,555,458

UNITED STATES PATENT OFFICE.

STEPHEN J. CLULEE, OF ATTLEBORO, MASSACHUSETTS, ASSIGNOR TO BAY STATE OPTICAL COMPANY, OF ATTLEBORO, MASSACHUSETTS, A CORPORATION OF MAINE.

EYEGLASS CONSTRUCTION.

Application filed February 2, 1923. Serial No. 616,488.

*To all whom it may concern:*

Be it known that I, STEPHEN J. CLULEE, a citizen of United States of America, and a resident of the city of Attleboro, county of Bristol, and State of Massachusetts, have invented an Improvement in Eyeglass Construction, of which the following is a specification.

This invention relates to eyeglass construction. One of the objects thereof is to provide a construction of the above nature strong and durable and capable of highly efficient action in use. Another object is to provide such a construction wherein the component parts are easily joined in assembled relation and in such relation are compactly and securely held. Another object is to provide a construction of the above nature which is simply and inexpensively made. Other objects will be in part obvious or in part pointed out hereinafter.

The invention accordingly consists in the features of construction, combinations of elements and arrangements of parts as will be exemplified in the structure to be hereinafter set forth, and the scope of the application of which will be indicated in the following claims.

In the accompanying drawing in which is shown one of the various possible embodiments of this invention, Figure 1 is a rear elevation of a pair of eyeglasses; and Figure 2 shows in perspective and in detached relation certain parts shown in Fig. 1.

Similar reference characters refer to similar parts in both views of the drawing.

Referring now to the drawing in detail, there is shown in Fig. 1 a pair of eyeglass rim members 10 and 11, preferably of a non-metallic material, such as celluloid, for example. One of the rims, as 10, may be provided with a handle member 12 formed integral therewith and adapted for convenient handling of the eyeglasses. As shown in Fig. 2, the rim member 10 is provided upon its outer surface facing the rim 11 with a groove or recess 13 extending substantially from the horizontal center line of the eyeglasses to the top of the rim, which groove 13 is adapted to receive an elongated metallic member 14 shaped to substantially arcuate form to follow the curve of the rim 10. The rim member 11 is likewise provided with a similar groove adapted to receive a metallic member 15, but since the construction is essentially the same for both rims, one only will be described in detail.

The member 14 is provided adjacent its upper end with a lug 16 having an opening 17 therethrough. Pivotally connected to the lug 16 by means of a pin 18 is an end member 19 provided with depending ears 20 in which are formed openings registering with the opening 17 and through which the pin 18 passes. Inserted within the end of the member 19 which is securely clamped thereabout is the end of a spring bridge member 21, the other end of which is secured in like manner to a similar end member 22 which is in turn pivotally connected to the member 15 resting in the groove in the rim member 11. The bridge member 21 is preferably a flat spring, as shown more clearly in Fig. 2.

Adjacent the lower ends of the members 14 and 15 and preferably formed integral therewith are a pair of nose pieces 23 and 24, respectively. From the above it will be seen that the bridge 21 and the nose pieces 23 and 24 are joined by the members 14 and 15 to form a substantially unitary device which is secured to the eyeglass rims in a manner which will now be described.

At the upper end of the groove 13 is formed a recess 25 which is adapted to receive the end 26 of the member 14 projecting beyond the lug 16. The other end of the member 14 extending beyond the nose piece 23 is provided with an opening registering with openings in the rim 10 adapted to receive a pin 27. The member 15 rests within the recess in the rim 11 in a similar manner and is similarly secured by a pin 28. Thus, in assembling the parts, the members 14, 15 and 21 having been joined as above described, the entire device including the bridge and the nose pieces may be attached to the eyeglass rims by slipping the upper ends of the members 14 and 15 into the recesses 25 and inserting the pins 27 and 28. The parts are then securely held in assembled relation and removal of the pins 27 and 28 permits removal of the bridge and nose pieces as a unit. The rims 10 and 11 are preferably enlarged as at 10ª and 11ª to provide a reinforcement about the recesses 25 and to conform to the general line of the contour of the arched bridge 21. The members 14 and 15 preferably rest within the grooves in the rims 10 and 11 so that their outer surfaces are substantially flush with the peripheries of the rims.

As shown in Fig. 2, the top portions of the end members 19 and 22 are extended over to provide portions 29 and 30 between the ears 20. As the rim 10 and the member 14 swing outwardly, that is, away from the rim 11 upon the pivot 18, the metallic end portion 26 comes into contact with the portion 29 thus limiting this swinging movement. A similar contact occurs between the end of the member 15 and the portion 30 to limit the swinging movement of the rim 11. Thus there is provided a metallic stop limiting the swinging movement of the rims about their pivot pins. Further separation of the rims distorts the spring 21 and the latter tends to urge the nose pieces 23 and 24 together to grip the nose. From the above it will be seen that frictional contact with the non-metallic rim members is effectively avoided. The members 14 and 15, furthermore, form reinforcement for the non-metallic rim members preventing the celluloid or other material from warping and thus throwing the bridge member and nose pieces out of line. The parts are securely assembled and yet readily removable for replacement or repair.

As various possible embodiments might be made of this invention and as many changes might be made in the embodiment herein set forth, it is to be understood that all matter hereinbefore set forth or shown in the accompanying drawings is to be interpreted as illustrative and not in a limiting sense.

I claim as my invention:

1. In eyeglass construction, in combination, a pair of rim members and a unitary device removably attached thereto comprising nose-engaging members and a bridge pivotally connecting said pair of rim members together.

2. In eyeglass construction, in combination, a pair of rim members and a unitary device removably attached thereto comprising nose-gripping members and a spring bridge pivotally connecting said pair of rim members and adapted to urge said nose-gripping members toward each other.

3. In eyeglass construction, in combination, a non-metallic rim member, a metallic member substantially embedded therein, a nose piece connected to said metallic member, and a bridge member connected to said metallic member.

4. In eyeglass construction, in combination, a rim member, an arcuate member removably mounted thereon, a nose piece connected to said arcuate member adjacent one end thereof, and a bridge member pivotally connected to said arcuate member adjacent the other end thereof.

5. In eyeglass construction, in combination, a rim member, a substantially arcuate member removably mounted thereon, a nose piece formed integral with said arcuate member adjacent one end thereof, and a bridge member pivotally connected to said arcuate member adjacent the other end thereof.

6. In eyeglass constructon, in combination, a non-metallic rim member, a metallic member substantially embedded therein, a nose piece connected to said metallic member, and a bridge member pivotally connected to said metallic member.

7. In eyeglass construction, in combination, a rim member having a recess formed therein, an elongated member secured within said recess, a nose piece connected to said elongated member adjacent one end thereof, and a bridge member connected to said elongated member adjacent the other end thereof.

8. In eyeglass construction, in combination, an inner non-metallic rim member, an outer metallic member removably secured thereto, a nose piece connected to said outer metallic member, and a bridge member pivotally connected to said outer metallic member.

9. In eyeglass construction, in combination, a non-metallic rim member having a groove formed therein, means forming a recess at one end of said groove, a metallic member within said groove and having an end resting in said recess, means securing the other end of said metallic member to said non-metallic rim member, and a bridge member connected to said metallic member.

10. In eyeglass construction, in combination, a non-metallic rim member having a groove formed therein, means forming a recess at one end of said groove, a metallic member within said groove and having an end resting in said recess, means securing the other end of said metallic member to said non-metallic rim member, and a nose piece connected to said metallic member.

11. In eyeglass construction, in combination, a non-metallic rim member having a groove formed therein, means forming a recess at one end of said groove, a metallic member within said groove and having an end resting in said recess, means securing the other end of said metallic member to said non-metallic rim member, a bridge member connected to said metallic member adjacent one end thereof, and a nose piece connected to said metallic member adjacent the other end thereof.

12. In eyeglass construction, in combination, a non-metallic rim member having a groove formed therein, a metallic member secured within said groove and having its outer surface substantially flush with the surface of said rim member, a bridge member pivotally connected to said metallic member, and a nose piece connected to said metallic member.

13. In eyeglass construction, in combination, a pair of rims, a unitary device comprising nose engaging members and a bridge pivotally connecting said rims, said unitary device being secured upon said rims by means of a pair of removable pins respectively passing through said pair of rims.

14. In eyeglass construction, in combination, a pair of rims, a unitary device comprising nose engaging members and a bridge pivotally connecting said rims, said unitary device being removably secured to said rims by parts thereof entering said rims and interlocking therewith.

15. In eyeglass construction, in combination, a non-metallic rim member, a metallic member resting against and substantially conforming to the curvature of a portion of said rim member and secured thereto, a bridge member pivotally connected to said metallic member adjacent one end thereof, and a nose piece connected to said metallic member adjacent the other end thereof.

16. In eyeglass construction, in combination, a non-metallic rim member having a groove formed therein, a metallic member secured within said groove and having its outer surface substantially flush with the surface of said rim member, a bridge member pivotally connected to said metallic member adjacent one end thereof, and a nose piece connected to said metallic member adjacent the other end thereof.

17. In eyeglass construction, in combination, a non-metallic rim member having a groove formed therein, a metallic member resting in said groove interlocking with said rim member adjacent one end thereof and removably attached to said rim member adjacent the opposite end, and a bridge member connected to said metallic member.

18. In eyeglass construction, in combination, a non-metallic rim member, and a metallic device removably mounted thereon comprising bearing means adapted to form a pivotal connection with a bridge member, a nose piece adapted to engage the nose, and substantially rigid connecting means between said bearing means and nose piece.

19. In eyeglass construction, in combination, a non-metallic rim member, a metallic member resting against and shaped to substantially conform to the curvature of a portion of said rim member secured thereto, a nose engaging member connected to said metallic member adjacent one end thereof, a transverse lug upon said metallic member adjacent the other end thereof, and a bridge member pivoted upon said lug.

20. In eyeglass construction, in combination, a non-metallic rim member, a substantially arcuate metal member having one end entering a recess in said rim member and interlocking therewith and the other end removably secured to said rim member, a nose piece connected to said metal member adjacent one end thereof, and a bridge member connected to said metal member adjacent the other end thereof.

In testimony whereof, I have signed my name to this specification this 25th day of January 1923.

STEPHEN J. CLULEE.